(No Model.)
J. PLAYER.
CAR WHEEL.
No. 533,081. Patented Jan. 29, 1895.
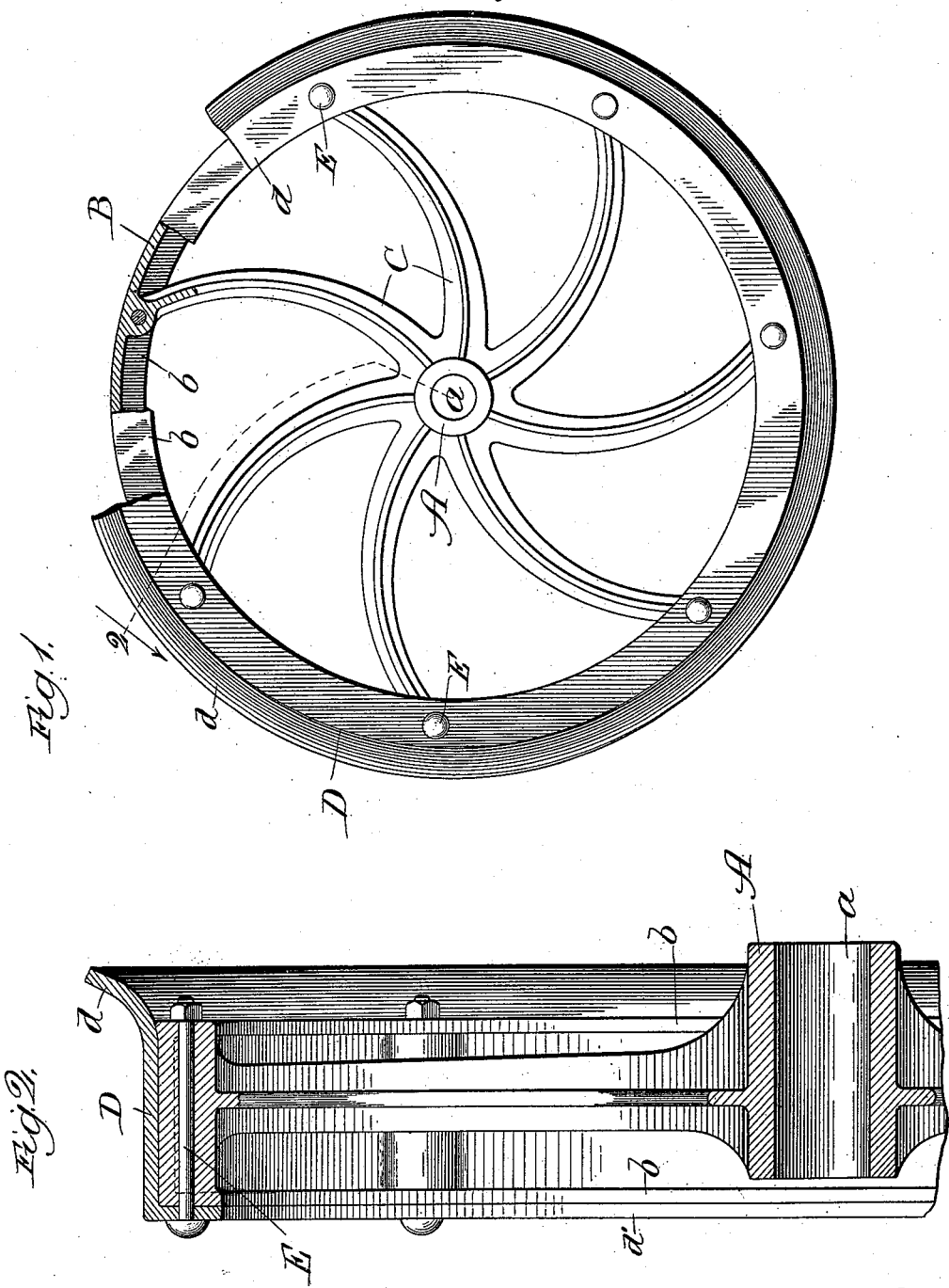

UNITED STATES PATENT OFFICE.

JOHN PLAYER, OF TOPEKA, KANSAS.

CAR-WHEEL.

SPECIFICATION forming part of Letters Patent No. 533,081, dated January 29, 1895.

Application filed March 20, 1894. Serial No. 504,410. (No model.)

*To all whom it may concern:*

Be it known that I, JOHN PLAYER, of Topeka, Shawnee county, Kansas, have invented certain new and useful Improvements in Car-Wheels, of which the following is a specification.

The object of my invention is to provide a simple, light and efficient car wheel, especially adapted for use in connection with hand cars, push cars, or other light cars generally used on railway lines; and the invention consists in the features and combinations hereinafter described and claimed.

In the drawings, Figure 1 is a side elevation of my improvement, with a portion of the tire broken away; and Fig. 2 an enlarged sectional view, taken on line 2 of Fig. 1.

In the manufacture of car wheels for light trucks, push cars, hand cars, &c., it has long been desired to provide the lightest possible wheel with a removable tire, and to so construct the center portion as to use the least possible amount of metal and obtain the maximum wearing advantages and take up the strains incident to the running of the car. In those now in use, the construction is such that the tire is merely shrunk on, and the shape of the center portion is such that the moment the tire loosens at all, the constant hammering—incident to the running of the wheel and car—will quickly loosen the tire entirely or break the center of the wheel.

To avoid the above objections, as well as to provide a light and efficient car wheel, I construct a wheel having a central hub, A, provided with the usual axial opening, $a$, adapted to be forced upon the axle. I provide an outer rim, B, having internal annular flanges, $b$, on each edge of the peripheral surface of the rim, and connect the rim and hub together by means of curved, cross-shaped spokes, C, the whole forming one integral casting. The shape of the rim, with its internal annular flanges, gives the greatest strength with the least amount of metal, and the curved cross-shaped spokes permit of the expansion and contraction of the casting during its forming, and also give the greatest strength for the least amount of metal. I prefer to make this center portion of malleable cast iron, though it is evident other materials could be used. I secure to this central portion a chilled or steel tire, D, having an external projecting flange, $d$, for the purpose of keeping the wheel on the track, and an internal annular flange, $d'$, for the purpose of strengthening the tire and securing it to the center portion. The inner bore of the tire is of such a diameter that the tire may be shrunk on to the rim; but to more fully secure the tire and center together, I provide a number of bolts or rivets, E, which pass through openings or holes in the internal flange of the tire and bosses on the cast center, and screw up or rivet the portion securely together. By using these bolts, the danger due to the loosening of the tire upon the center is minimized, as they can be tightened as soon as any loose play is discovered, and thus prevent the constant hammering after such loosening of the tire and center, which would otherwise result in the destruction of the wheel.

By constructing the cast center as above described, I get the greatest amount of strength and rigidity for the material used, enabling me to make the ordinary car wheel center for a hand car, which is usually about twenty inches in diameter, of a weight not exceeding twenty four pounds, while in the ordinary constructions it will weigh forty pounds; and my entire wheel can be made of a weight not exceeding forty pounds, while in the ordinary constructions the weight is from sixty pounds up. This advantage will be appreciated when it is remembered that hand or push cars have to be lifted off the track by hand power a great many times and every pound of weight dispensed with is so much labor saved. Also, when the tire is worn out, it may be easily taken off and a new one replaced, thus using the cast central portion for an indefinite period of time.

I claim—

1. An improved car wheel center composed of a hub, a rim having internal annular flanges at each edge of its peripheral surface, and radial arms connecting the hub and rim in one integral casting, substantially as described.

2. An improved car wheel, composed of a central portion having a hub, a rim provided with internal annular flanges at each edge of its peripheral surface, and radial arms connecting the hub and rim in one integral casting, in combination with a flanged tire, and means for securing the tire and central portion together, substantially as described.

3. An improved car wheel, composed of a central portion having a hub, a rim provided with internal annular flanges at each edge of its peripheral surface, and curved radial arms cross-shaped in cross section connecting the hub and rim in one integral casting, in combination with a flanged tire shrunk upon the rim, and screw bolts for securing the tire and central portion together, substantially as described.

JOHN PLAYER.

Witnesses:
  D. E. CAIN,
  THOS. MASON.